F. ROCK.
End-Gate Fastening.

No. 208,928.   Patented Oct. 15, 1878.

Witnesses.
Charles A. Kunk
Rufus T. Griggs

Inventor.
Frederick Rock
per Atty.
Isaac S. Signor

UNITED STATES PATENT OFFICE.

FREDERICK ROCK, OF SKANEATELES, ASSIGNOR OF ONE-HALF HIS RIGHT TO NELSON MORELAND, OF SENNET, NEW YORK.

IMPROVEMENT IN END-GATE FASTENINGS.

Specification forming part of Letters Patent No. 208,928, dated October 15, 1878; application filed March 22, 1878.

*To all whom it may concern:*

Be it known that I, FREDERICK ROCK, of the town of Skaneateles, county of Onondaga, and State of New York, have invented an Improvement in Jointed Adjustable Rods and Fastenings for the purpose of holding the end-boards of wagon-boxes in position or enabling the same to be easily removed, and for other and similar uses and purposes, of which the following is a specification:

The object I have in view is to provide a jointed rod and fastening by means of which the end-boards of wagon-boxes or other objects may be held in place or any similar result accomplished, or the same removed more readily and speedily than by means of the rods now in use.

The invention comprises a rod having two parts, each of which consists of a piece of iron or other metal, terminating at one end in a hook having a curved outer and inner surface, the curved inner surface of the one part fitting over and upon the curved outer surface of the other, and fastened or held together by means of a lever or bar fastened to both pieces by means of screws, bolts, rivets, or other similar devices. The other ends of the rods or parts of rods terminate in a ball or head made to fit the head of the screw, hereinafter described. These rods are intended to be made and used in connection with screws placed in the side or end of any object to which it may be desired to fasten any other board or object by means of the rod. These screws are held in position by means of an outer and inner nut, by means of which they may also be lengthened or shortened, as required. Each of said screws is provided with an open or slotted head, one side of which is countersunk to receive and hold the end or head of the rod, which is lifted out of or thrown into position by means of the lever aforementioned.

Figure 1 is a view of the entire invention as seen when in position for fastening or holding in position the objects to which it may be attached.

Fig. 2 represents a piece or portion of the rod, slotted at $c$ for a screw or bolt to fasten it to the end-board of the wagon or other object in connection with which it may be used, the slot and screw or bolt being so arranged that this portion of the rod may move backward and forward by means of this slot and screw. The rod B, terminating in one end in the ball or head $g$ and in the other in the hook $e$, has a shoulder or socket, $d$, to receive the end of the hook $e'$, the curved outer surface of the hook $e$ being made to fit and receive upon it the curved inner surface of the hook $e'$ of rod C.

Figure 1:
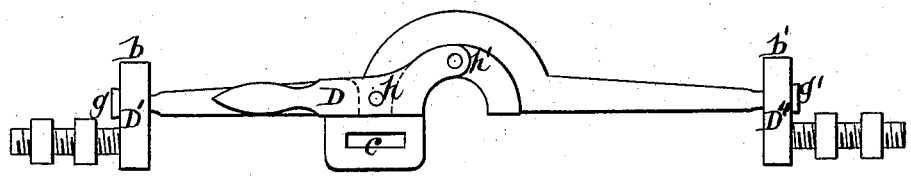
Figure 2:
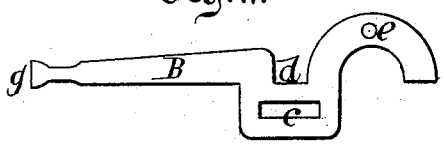
Figure 3:
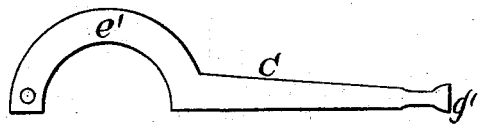
Fig. 3 represents another part or portion of the rod C, terminating in the ball or head $g'$ at one end, and at the other extremity in the hook $e'$, made to fit upon the hook $e$, the extreme end of $e'$ fitting into and resting upon the shoulder $d$.
Figure 4:
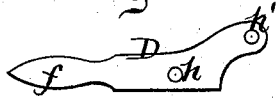
Fig. 4 represents a lever or bar, by means of which the parts of the rod are fastened together by screws at $h$ and $h'$ and are held in position, and by means of which the ends $g$ and $g'$ of the rod are forced out of or into the places $b$ and $b'$, countersunk to receive them in the screw-heads $D'$ $D''$.
Figure 5:
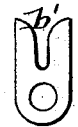
Figs. 5 and 6 represent one of the screws with slotted head countersunk at $j$ to receive and hold the heads $g$ and $g'$ of the rods B and C. $k$ and $k'$ are nuts made to work upon the screw, by means of which the device may be adjusted to boxes or other objects of various lengths or widths.
Figure 6:
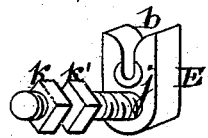

By means of the nuts $k$ and $k'$ the screw having the slotted head is fastened to the side or end of the box or other object and adjusted to the proper length to receive the ends or heads $g$ $g'$ of the rod, as shown in Fig. 1; also, B and C are fastened together by means of the lever or bar D, as shown in the same figure, and $e$ is fastened to the end-board or other object on which it may be used by means of a screw or bolt at the slot $c$.

The lever D being raised by means of the handle $f$, the portion $e'$ of the rod C is lifted from the portion $e$ of the rod B, and at the same time is forced backward, throwing the end $g'$ out of the countersunk head of the screw, and in like manner B is forced back along the rivet or bolt at the slot $c$ and the end or head $g$ is thrown out of the slotted and countersunk head of the screw $D'$, when the end-board or other object is readily removed or raised out of its position or allowed to assume any position desired. When it is desired again to fasten the object in any position the ends of the rod are allowed to drop into the slotted heads of the screws, and then, by bringing the lever down to the position shown in Fig. 1, the parts e e' of the rods B and C are again drawn together, and the heads or balls g g' upon the outer ends of the rods B and C are drawn into the countersunk places in the outer side of the screw-heads D' D" and held firmly in position.

What I claim as my invention, and desire to secure by Letters Patent, is—

1. The combination of rods B C, hooks e e', slot c, and lever D, substantially as described.

2. The screw or bolt E, provided with a slotted and countersunk head, substantially as described.

3. The screw or bolt E, provided with slotted and countersunk head, in combination with rods B C, provided with the heads g g', substantially as set forth.

4. The combination of the rods B C, lever D, and screw E, substantially as and for the purposes described.

FREDERICK ROCK.

Witnesses:
LEWIS P. MORELAND,
CHARLES E. SIGNOR.